Dec. 26, 1933.  E. H. ELLISON  1,940,943
SLIDING AND FOLDING PARTITION CASTER
Filed Jan. 21, 1930  6 Sheets-Sheet 2
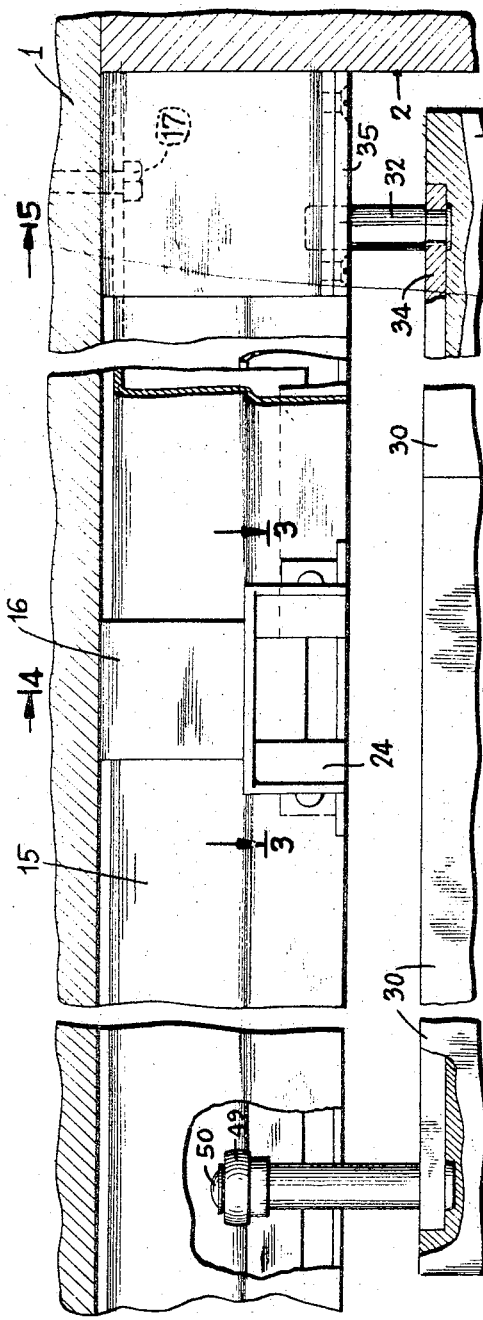
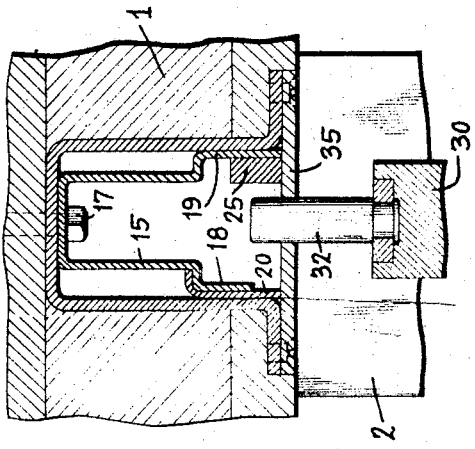
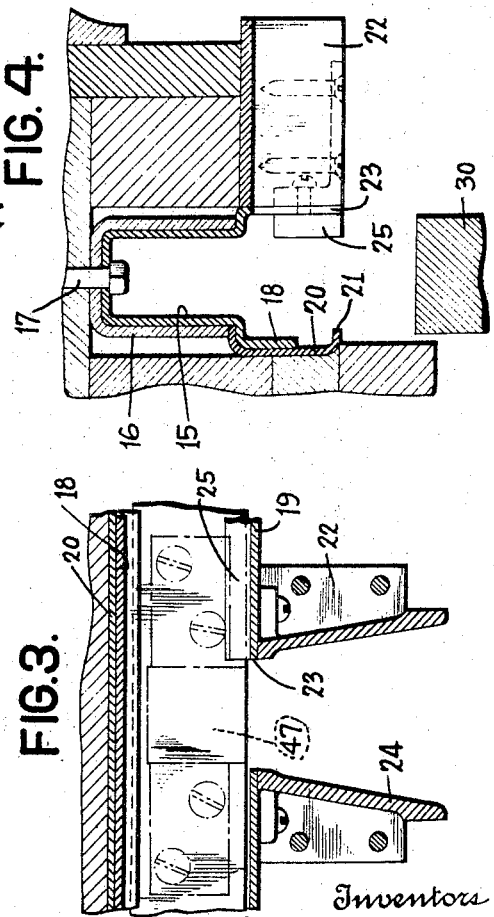
Inventor
EDWARD H. ELLISON
By his Attorneys
Bohleber + Ledbetter Dec. 26, 1933.  E. H. ELLISON  1,940,943
SLIDING AND FOLDING PARTITION CASTER
Filed Jan. 21, 1930  6 Sheets-Sheet 3

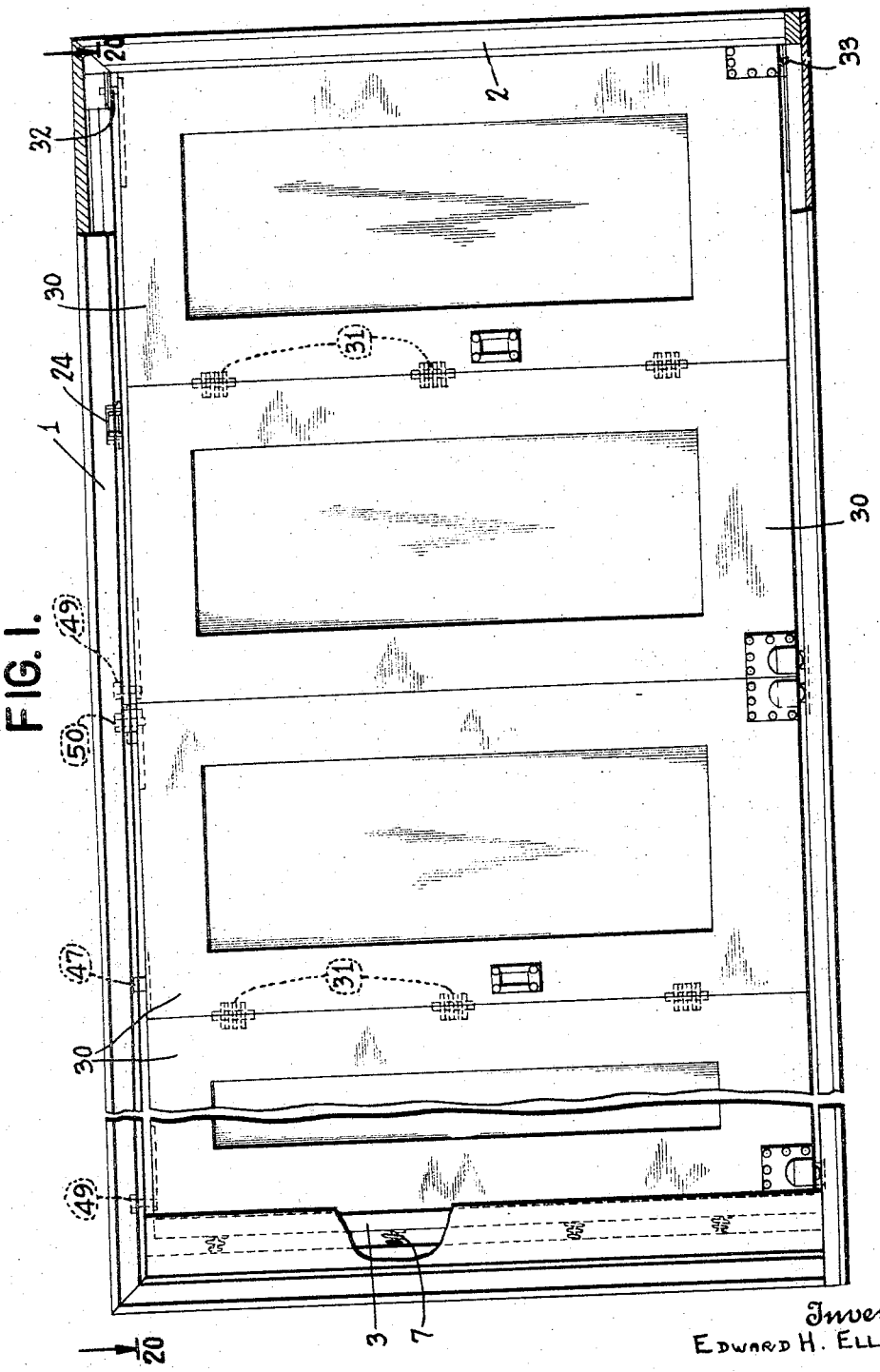

Inventor
Edward H. Ellison
By his Attorneys
Bohleber + Ledbetter

Dec. 26, 1933.   E. H. ELLISON   1,940,943
SLIDING AND FOLDING PARTITION CASTER
Filed Jan. 21, 1930   6 Sheets-Sheet 4
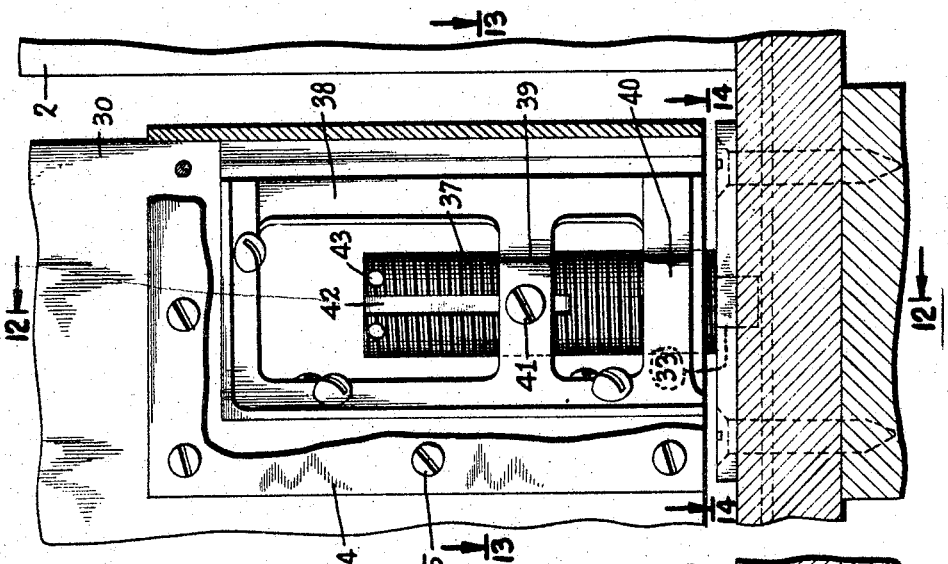
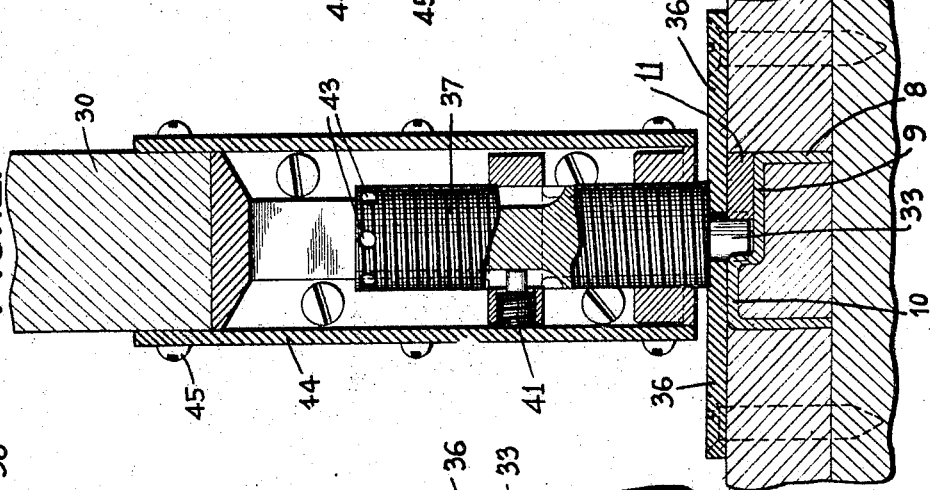
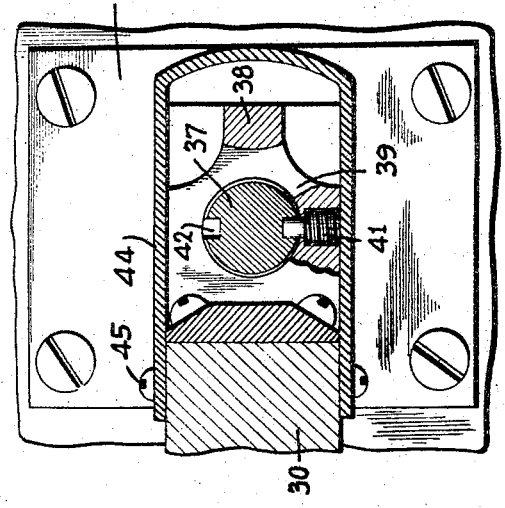
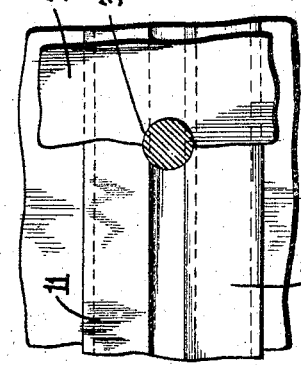
Inventor
EDWARD H. ELLISON
By his Attorneys
Bohleber + Ledbetter

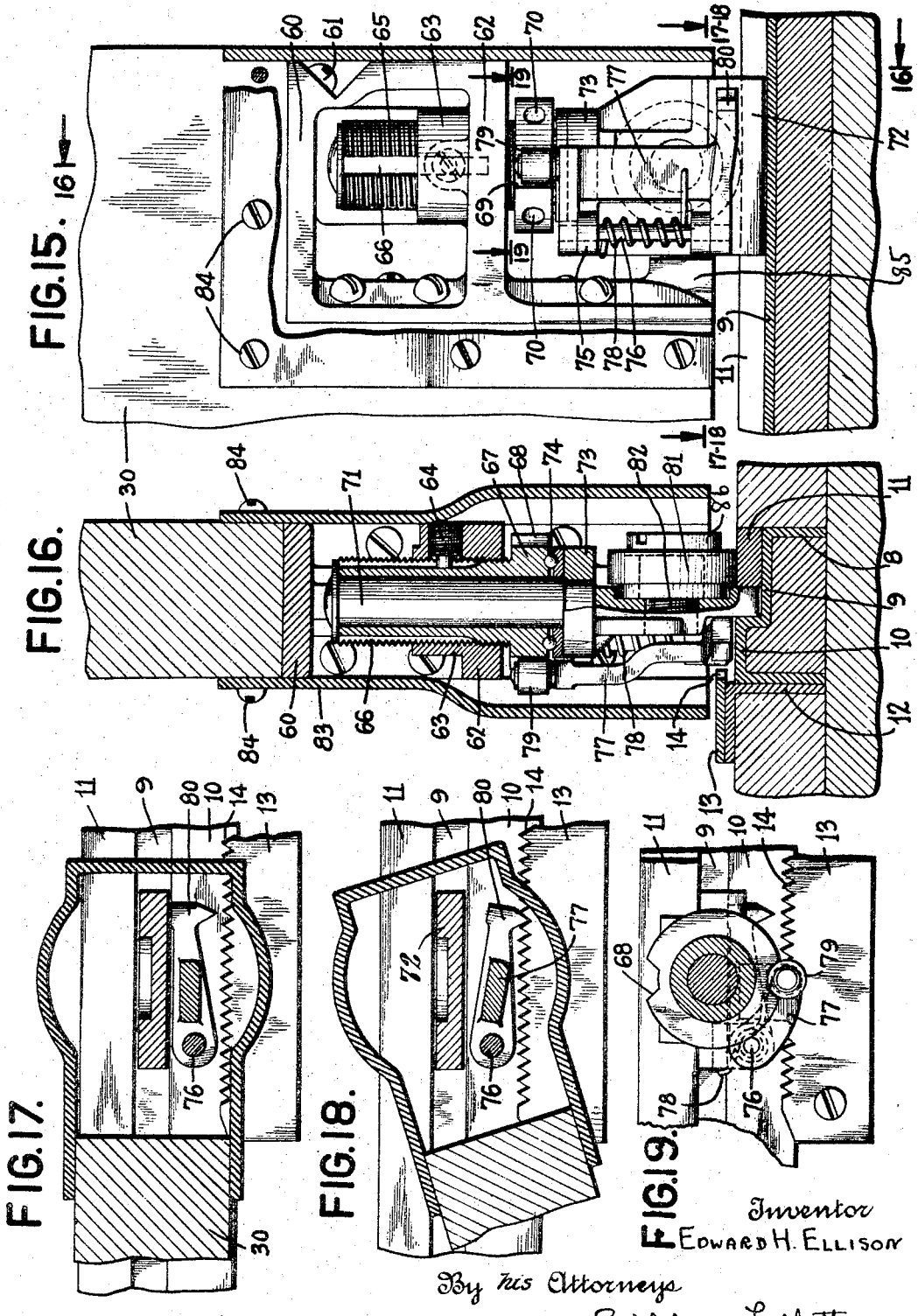

Dec. 26, 1933.    E. H. ELLISON    1,940,943
SLIDING AND FOLDING PARTITION CASTER
Filed Jan. 21, 1930    6 Sheets-Sheet 6
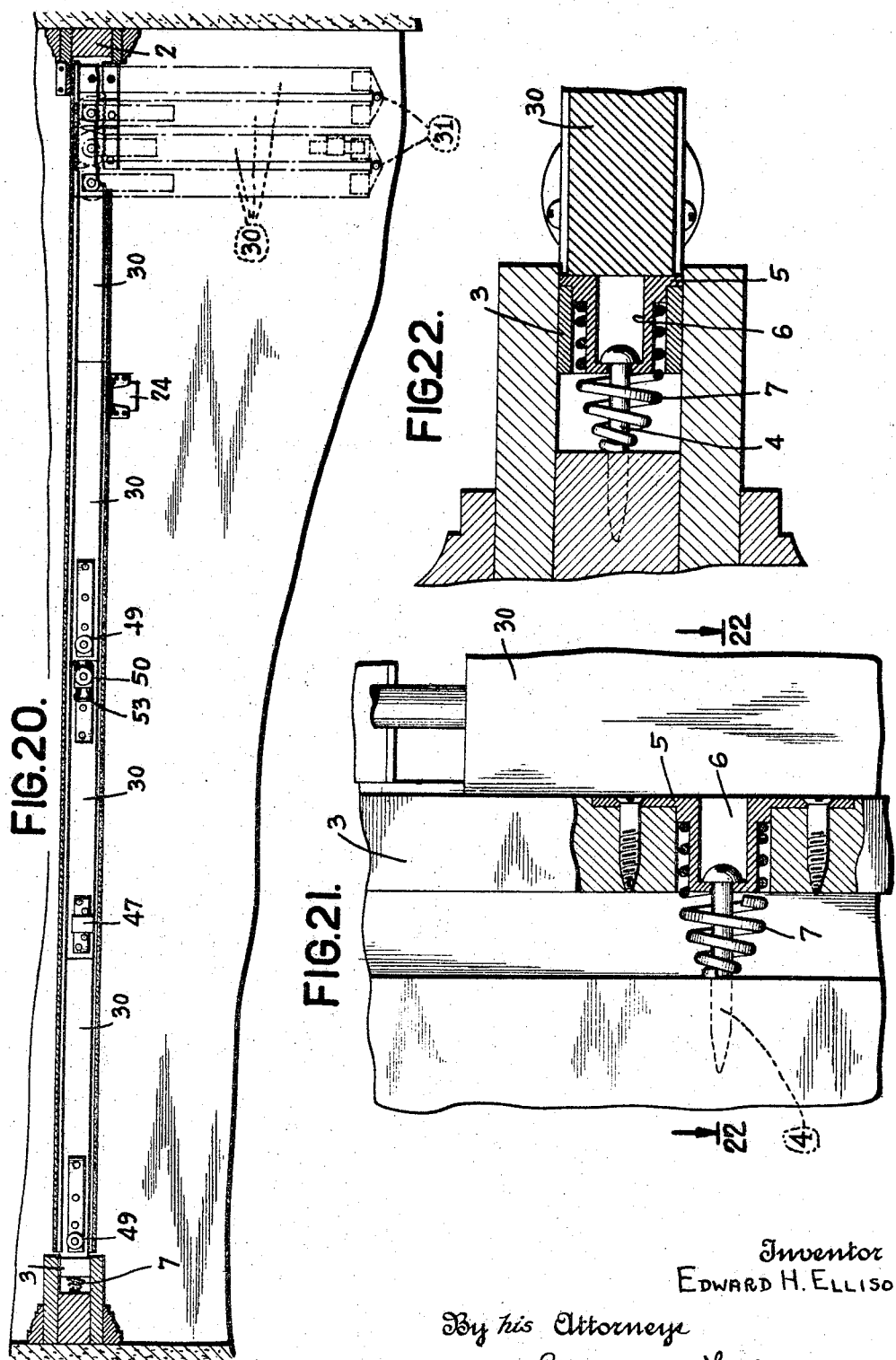
Inventor
EDWARD H. ELLISON
By his Attorneys
Bohleber & Ledbetter Patented Dec. 26, 1933

1,940,943

UNITED STATES PATENT OFFICE 1,940,943

SLIDING AND FOLDING PARTITION CASTER

Edward H. Ellison, Jamestown, N. Y., assignor, by mesne assignments, to Austral Window Company, New York, N. Y., a corporation of Maine Application January 21, 1930. Serial No. 422,271

10 Claims. (Cl. 16—87)

The present invention relates to folding doors and embodies, more specifically, an improved folding door construction in which the elements thereof are of a materially improved construction over the corresponding elements of doors of this character now available.

The comparatively great weight of these doors must be carried upon relatively small fixtures, the weight of each door section being supported entirely by only one fixture. In addition to being sufficiently strong to carry the weight of the door section, these fixtures must be of such character that pivotal movement of the door section is accommodated.

The most serviceable type of folding door is one in which each section is positively locked in a pivoting position, in such position, the section being capable of hinged movement about its pivot points into extended or collapsed position. When the door has been swung away from the plane of the tracks in the doorway, there is great danger that the door may fall over by dislodgment of the upper or lower supporting and guiding elements. In order that the possibility of such movement may be entirely eliminated, it is very desirable that the supporting and guiding members for the door be locked positively in a given position upon the initial turning movement of the door.

With a view to providing a structure of this character and affording a means for locking the door supporting and guiding elements positively in proper position, the device described herein has been designed and, as the description proceeds, a great number of advantageous features will be found to be embodied herein.

An object of the invention, accordingly, is to provide a folding door having supporting elements of such character that the door may be locked positively in a hinging position both at the top and bottom thereof.

A further object of the invention is to provide a construction of the above character in which the locking elements are brought into play immediately upon the initial turning movement of the door from an extended position toward a collapsed or folded position.

A further object of the invention is to provide an improved door supporting structure which may be readily assembled without the necessity of exercising undue precision during the assembly thereof, the completed door with all hardware being mounted after the guide tracks have been installed.

A further object of the invention is to provide a folding door construction in which the locking mechanism for the door supporting means is positively actuated and moved into locking position upon initial turning movement of the door.

A further object of the invention is to provide a unitary and self-contained door supporting, guiding and swivelling element which carries a locking mechanism moved positively by the swivelling element.

Further objects, not specifically enumerated above, will be apparent as the invention is described in greater detail in connection with the accompanying drawings, wherein:

Figure 1 is a view in front elevation, showing a doorway constructed in accordance with the present invention and carrying folding door sections mounted upon guiding and supporting elements in accordance with the present invention.

Figure 2 is an enlarged view in front elevation, partly broken away and in section, showing portions of the upper guide track and door supporting elements.

Figure 3 is a view in section, taken on line 3—3 of Figure 2, and looking in the direction of the arrows.

Figure 4 is a view in section, taken on line 4—4 of Figure 2, and looking in the direction of the arrows.

Figure 5 is a view in section, taken on line 5—5 of Figure 2, and looking in the direction of the arrows.

Figure 11 is a view in front elevation, partly broken away and in section showing the lower pivoting and supporting member for the door section which is permanently pivoted in position.

Figure 12 is a view in section, taken on line 12—12 of Figure 11, and looking in the direction of the arrows.

Figure 13 is a view in section, taken on line

Figure 6:
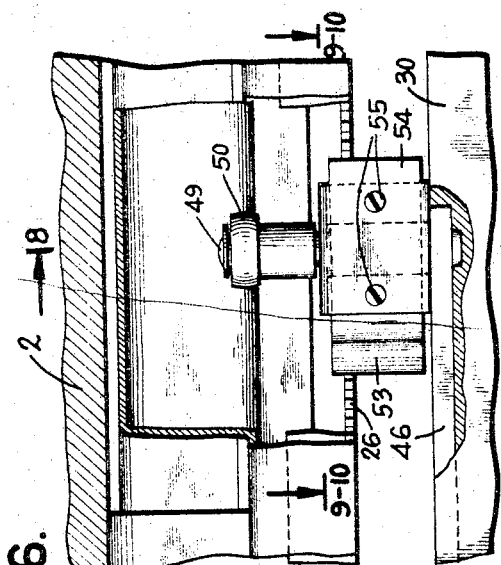
Figure 6 is a view in front elevation, partly broken away and in section, showing, more specifically, the guiding and locking mechanism at the top of a door section.
Figure 7:
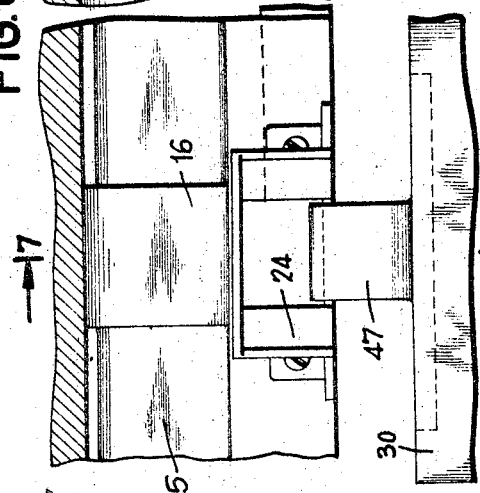
Figure 7 is a view in section, taken on line 7—7 of Figure 6, and looking in the direction of the arrows.
Figure 8:
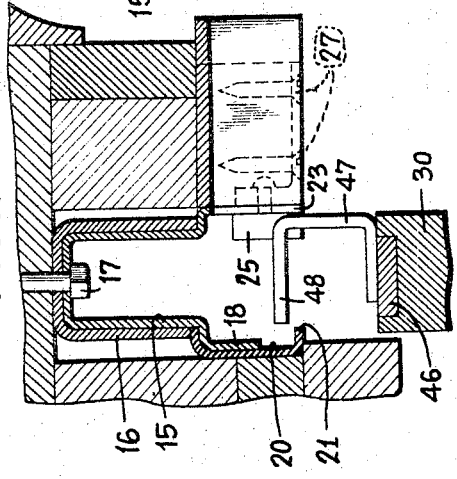
Figure 8 is a view in section, taken on line 8—8 of Figure 6, and looking in the direction of the arrows.

13—13 of Figure 11, and looking in the direction of the arrows.

Figure 14 is a view in section, taken on line 14—14 of Figure 11, and looking in the direction of the arrows.

Figure 15 is a view in front elevation showing the lower pivoting, supporting and guiding member for the door sections which slide and turn.

Figure 16 is a view in section, taken on line 16—16 of Figure 15, and looking in the direction of the arrows.

Figure 17 is a view in section, taken on line 17—17 of Figure 15, and looking in the direction of the arrows.

Figure 18 is a view similar to Figure 17, showing the locking mechanism moved into a locked position by a partial turning movement of the door.

Figure 19 is a view in section, taken on line 19—19 of Figure 15, and looking in the direction of the arrows.

Figure 20 is a view in section, taken on line 20—20 of Figure 1, and looking in the direction of the arrows.

Figure 21 is an enlarged view in front elevation, partly broken away and in section, showing the yielding side member of the doorway of Figures 1 and 20.

Figure 22 is a view in section, taken on line 22—22 of Figure 21, and looking in the direction of the arrows.

Referring to the above drawings a doorway is shown at 1, having a stationary side 2, and a yieldingly movable side 3. The side 3 is secured in position by means of screws or bolts 4, see Figure 22, these screws engaging fittings 5 which are inserted in the movable side 3 so that the outer faces thereof lie flush with the side of the doorway. Recessed portions 6 are formed in the fittings to receive the bolts 4 and also serve as seats for coil springs 7 which normally urge the side 3 and fitting 5 outwardly. From the foregoing structure there results a yielding side for the doorway which is engaged by a suitable door section to afford a tight closure for the doorway.

Although any number of door sections may be used, the present construction is shown as embodying four sections, these sections being extended and indicated at 30, and hinged together at 31. The right hand door section is permanently pivoted at its top and bottom by pivot pins 32 and 33, respectively. Pivot pin 32 is carried by a plate 34 in the top edge of the door and lying flush therewith. This pin is secured in the top of the doorway by means of plate 35, in this manner permitting only pivotal movement of the right hand door section about the axis of such pin.

The lower pin 33 is likewise secured in its proper position by means of a floor plate 36, such pin being formed as an extension upon a threaded shaft 37, see Figures 11 and 12. A metallic frame 38 is formed with horizontal threaded members 39 and 40 to receive the threaded shaft 37 and a set screw 41 is adapted to engage grooves 42 to secure the shaft 37 in a desired position. Recesses 43 are formed in the shaft to be engaged by a suitably formed wrench, thus facilitating the vertical adjustment of shaft 37 and the height of the door from the floor. A cover member 44 fits over the frame 38 to conceal the elements thereof and finish the door properly and may be secured in position by means of screws 45. The foregoing description illustrates the manner of mounting the extreme right hand door section for pivotal movement only and it will be seen that the height of such section above the floor may be easily varied.

With reference now to the grooves in the top of the door frame and the floor for guiding and supporting the door sections in position, the construction of the floor groove and track will be readily apparent from an inspection of Figures 15 and 16. A channel member 8 having a top portion 9 and an upwardly projecting portion 10 is secured in the floor in the plane of the doorway and doors. The upwardly projecting portion serves as one side of a groove, the other side of which is formed by a track plate 11 which rests upon and is secured to the upper side 9 of the channel. The track plate is spaced from the upwardly projecting portion 10 a distance sufficient to provide a groove of the desired width and receives a guide flange described more fully hereinafter. An inverted and reverse L-shaped plate 12 is secured with the channel 9 and carries a rack 13 having teeth 14. These teeth serve to permit the door sections to be locked in desired positions as described more fully hereinafter.

With particular reference to Figures 2, 3, 4, 5, 6, 7, 8, 9, and 10, the upper groove or track will be seen as formed of an inverted channel 15 secured at spaced intervals to supporting members 16 by means of screws 17. At the lower extremity of the channel 15, the sides thereof are offset outwardly as at 18 and 19. The offset portion 18 preferably carries a U-shaped channel 20 with an inwardly projecting flange 21, while the offset portion 19 carries a suitably spaced horn member 22 disposed opposite a cut away portion 23 in the offset portion 19. The horn member is formed with outwardly diverging arms 24 to serve as guide tracks for a guide arm carried upon the door and described more fully hereinafter.

A stop member 25 is secured on the inner side of offset portion 19 and is spaced to be aligned properly with the cut away portion 23. This stop serves as an abutment against which a stop 48 carried by the door engages to limit the sliding movement of the door and insure that pivotal movement thereof takes place only when it is in proper position therefor. At certain portions of the flange 21, teeth 26 are formed therein to be engaged by a locking member described more fully hereinafter. The horn 22 is preferably countersunk within the upper portion of the doorway and secured in position by means of screws 27.

The top of each sliding section is provided with a plate 46 which is preferably flush with the top edge of the door. This plate carries a guide arm 47 which is shown as being of generally U-shaped construction and providing a horizontal arm 48. The horizontal stop or arm rides within the upper track and abuts against stop 25 to limit the sliding movement of the door section in one direction. When the arm has engaged the stop 25, the former may be swung outwardly through the opening formed by the horn 22, thus permitting the door to be moved pivotally into folded or collapsed position.

Figure 10:
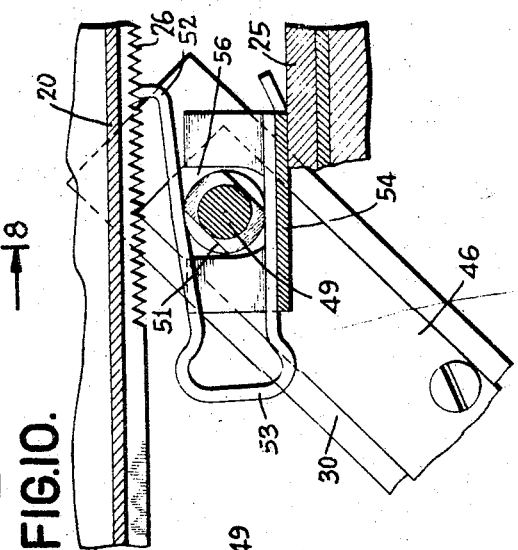
Figure 10 is a view similar to Figure 9, showing the locking mechanism for the upper door supporting member moved into locking position.
Figure 9:
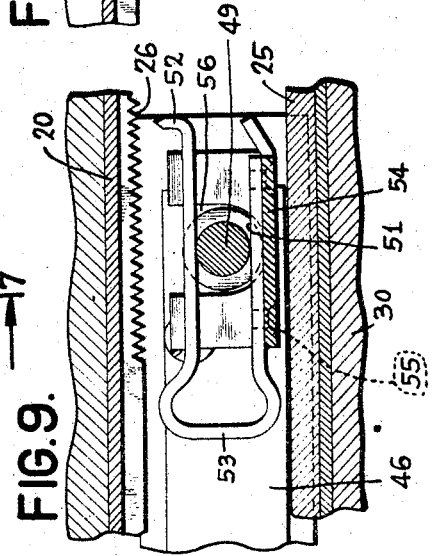
Figure 9 is a view in section, taken on line 9—9 of Figure 6, and looking in the direction of the arrows.

At the end of plate 46 distant from arm 47, an upwardly projecting shaft 49 is mounted. This shaft is provided with a suitably journaled roller 50 for engaging the sides of the channel members and is also formed with parallel cut away portions 51 to serve as cams for operating a locking finger 52. This finger is formed on a spring member 53 of the general shape of a hair pin in profile and the spring element thereof normally urges the finger away from teeth 26. When the door is in an extended position, the flat portions 51 are in the position shown in Figure 9, at which time the finger 52 is maintained out of position with teeth 26. As soon as pivotal movement of the door takes place, as shown in Figure 10, the cams formed by the flat surfaces 51 force finger 52 into engagement with an adjacent tooth 26 to lock the door in the proper position for pivotal movement. The finger 52 and member 53 may be mounted upon a U-shaped carrier 54 and secured thereto by means of screws 55. The parallel arms of the U-shaped member 54 are cut away at 56 to receive shaft 49 and permit unrestricted movement thereof.

The lower supporting member for the sliding door sections is formed on a frame 60 which may be secured in a cut away portion of the door by means of screws 61. This frame is formed with a horizontal member 62 having an internally threaded bushing 63 carrying a set screw 64. A threaded sleeve 65 is received within the threaded bushing and formed with diametrically disposed slots 66 for engagement by the set screw 64. The lower portion of the sleeve 65 is formed with a collar 67 having recessed portions 69 formed in the surface thereof for receiving a member to be described hereinafter. Recesses 70 are formed in the collar 67 to receive a suitable wrench to facilitate the adjustment of the sleeve 65 in the bushing 63 and thus permit the height of the door to be adjusted readily. Within sleeve 65, a shaft 71 is carried, the lower extremity of the shaft being formed with a guide flange 72 and a collar 73. Flange 72 rides in the groove formed between the upwardly extending portion 10 and the track 11 to guide the movement of the door. Collar 73 carries a bearing 74 to cooperate with a bearing surface on the lower face of collar 67, thus permitting the weight of the door to be journaled properly upon the fitting.

Upon the collar 73 and flange 72, spaced lugs 75 are formed. These lugs receive a pin 76 upon which a lock member 77 is journaled. A spring 78 normally urges the lock member 77 in the position shown in Figure 16 where it is against the flange 72. On the upper side of the lock member 77, a roller 79 is carried. This roller is adapted to lie within the recess 69 when the door is in an extended position parallel with the tracks and, in this position, the lock member 77 is as shown in Figure 16. Upon the lower extremity of the lock member 77, a dog 80 is formed, this dog being in the plane of rack 13 and teeth 14. Upon initial movement of the door pivotally, the position of the recesses 69 is changed and the roller 79 is caused to ride upon the surface of the collar 67 and force the lock member 77 outwardly. This is illustrated in Figures 17 and 18 and results in movement of dog 80 into engagement with a tooth of the rack 13. Figure 17 shows the elements in the position shown in Figure 16 at which time the door is in the extended position. In Figure 18, the door has been moved pivotally and the dog forced outwardly into engagement with the locking teeth.

A roller 81 is mounted upon a stud shaft 82 carried by the guide flange 72 and engages the track 11 to support the weight of the door section. To conceal the elements of the lower supporting member, a housing 83 is mounted thereover and secured in position by means of screws 84.

When the doors are in the folded position shown in Figure 20, a thrust abutment 85 preferably formed on the frame 60 and lying in the plane of the door (Fig. 15) is adapted to be brought by rotation of the door about its pivot 71 to a position in axial alignment with the stud shaft 82, and to bear on a thrust abutment 86. The abutment 86 is in fact the head of the stud 82 and is adapted to hold the caster wheel 81 in operative position on the track. When the door is rotated with reference to the track and flange 72 if the outer or free end of the door tends to sag by reason of the weight of the door, the thrust abutment 85, see Figure 15, on the door is pressed against the thrust abutment 86 on the caster wheel stud or shaft 82, which, of course, is always held in position on the track. Any tendency, therefore, of the door to sag is resisted by the track when the abutment 85 is rotated and positioned adjacent the abutment 86.

It will be seen from the above description that the door will be locked positively in a pivoting position upon initial movement of the door from extended position. The elements of each supporting member are mounted as a unit and great strength and reliability is characteristic thereof. The height of the door may be adjusted with facility and the elements upon the door and track may be assembled at the factory and readily installed, thus avoiding the necessity of exerting undue precision during installation.

By exerting the wedging or jamming action upon the locking members by movement of the door itself, the door is positively locked against displacement and movement other than pivotal movement. This highly effective mechanism is not found in existing structures and materially improves the folding door constructions now available. While the invention has been described with specific reference to the accompanying drawings, it is not to be limited, save as defined in the appended claims.

I claim as my invention:

1. In combination with a supporting and guiding track having locking teeth, a door supporting member comprising a frame having top and transverse members, a vertically disposed sleeve threaded in the transverse member, means to adjust the position of the sleeve, a shaft journalled in the sleeve, a recessed cam member on the sleeve, a pivoted arm on the shaft, an extension on the arm engaging the recess of the cam, a finger on the arm for engaging the teeth, and a spring normally urging the arm against the cam.

2. In combination with a supporting and guiding track having locking teeth, a door supporting member comprising a frame having top and transverse members, a vertically disposed sleeve threaded in the transverse member, means to adjust the position of the sleeve, a shaft journalled in the sleeve, spaced lugs on the shaft, an arm pivoted in the lugs, a locking finger on the arm for engaging the teeth, a recessed cam on the sleeve, an extension on the arm carrying a roller engaging the recess, and a spring for urging the roller normally into the recess.

3. A door supporting and guiding member comprising a frame, a shaft carried by the frame, an arm pivoted on the shaft, a cam on the frame for engaging the arm to move it outwardly, and a spring for moving the arm inwardly.

4. A door supporting and guiding member comprising a frame, a sleeve adjustably mounted in the frame, a shaft journaled in the sleeve, a cam on the sleeve, an arm pivoted on the shaft and engaging the cam, and a spring normally holding the arm against the cam.

5. A door supporting and guiding member comprising a frame, a sleeve adjustably mounted in the frame, a shaft journaled in the sleeve, a recessed cam on the sleeve, an arm pivoted on the shaft and engaging the recess in the cam, and a spring normally holding the arm against the cam.

6. A door supporting and guiding member comprising a frame, a sleeve carried by the frame, a shaft journaled in the sleeve, a cam on the sleeve, spaced lugs on the shaft, an arm pivoted on the spaced lugs, an extension on the arm engaging the cam, a locking member on the arm, and a spring normally urging the extension against the cam.

7. A door supporting and guiding member comprising a frame, a sleeve carried by the frame, a shaft journaled in the sleeve, a cam on the sleeve, spaced lugs on the shaft, an arm pivoted on the spaced lugs, an extension on the arm carrying a roller engaging the cam, a locking finger on the arm, and a spring normally urging the roller against the cam.

8. In combination with a supporting and guiding track having locking teeth, a door supporting member comprising a frame, a shaft journaled in the frame, a cam on the frame, an arm pivoted on the shaft and engaging the cam, a locking finger on the arm for engaging the teeth, and a spring for urging the arm normally against the cam.

9. In combination with a supporting and guiding track having locking teeth, a door supporting member comprising a frame, a sleeve on the frame, a shaft journaled in the sleeve, a recessed cam member on the sleeve, a pivoted arm on the shaft, an extension on the arm engaging the recess of the cam, a finger on the arm for engaging the teeth, and a spring normally urging the arm against the cam.

10. In combination with a supporting and guiding track having locking teeth, a door supporting member comprising a frame, a sleeve on the frame, a shaft journaled in the sleeve, spaced lugs on the shaft, an arm pivoted in the lugs, a locking finger on the arm for engaging the teeth, a recessed cam on the sleeve, an extension on the arm carrying a roller engaging the recess, and a spring for urging the roller normally into the recess.

EDWARD H. ELLISON.